United States Patent
Massarsky

(10) Patent No.: US 6,718,123 B1
(45) Date of Patent: Apr. 6, 2004

(54) PHOTOBOOTH/E-MAIL CENTER

(75) Inventor: Yefim Massarsky, Newton, MA (US)

(73) Assignee: Foto Fantasy, Inc., Windham, NH (US)

( * ) Notice: Subject to any disclaimer, the term of this patent is extended or adjusted under 35 U.S.C. 154(b) by 0 days.

(21) Appl. No.: 09/430,887

(22) Filed: Nov. 1, 1999

Related U.S. Application Data

(63) Continuation-in-part of application No. 08/969,976, filed on Nov. 13, 1997.

(51) Int. Cl.[7] .......................... H04N 5/225; H04N 5/91; H04N 7/04
(52) U.S. Cl. .......................... 386/117; 386/107; 386/46
(58) Field of Search ................................ 386/46, 1, 83, 386/107, 117, 121, 124, 38, 40; 348/207.99, 207.1, 207.11, 211.12, 222.1; 358/471, 302; H04N 5/225, 7/04, 5/91

(56) References Cited

U.S. PATENT DOCUMENTS 5,343,386 A * 8/1994 Barber 5,768,633 A * 6/1998 Allen et al.

* cited by examiner

Primary Examiner—Robert Chevalier
(74) Attorney, Agent, or Firm—Brian M. Dingman, Esq.; Mirick, O'Connell, DeMallie & Lougee, LLP

(57) ABSTRACT

A photobooth/e-mail center for taking a digitized photographic image of a user at a first station and retrieving and electronically displaying the digitized photographic image at a second station comprising: one or more first stations, comprising, a unit for taking the digitized photograph of the user; a first display for displaying the digitized photograph; a generator for generating a code corresponding to the digitized photographic image; printer for printing and delivering a hardcopy of the photograph to the user at the first station; and a circuit for transmitting the digitized photograph and the code to a first database residing in one or more second stations; the second station, comprising, an input circuit for electronically entering the code; a circuit for retrieving the stored digitized photograph from the first database in response to the input circuit for electronically entering the code; a receiver for receiving and storing the digitized photograph in response to the circuit for retrieving the stored digitized photograph from the first database; and a second circuit for transmitting the digitized photograph to one or more third stations.

11 Claims, 13 Drawing Sheets

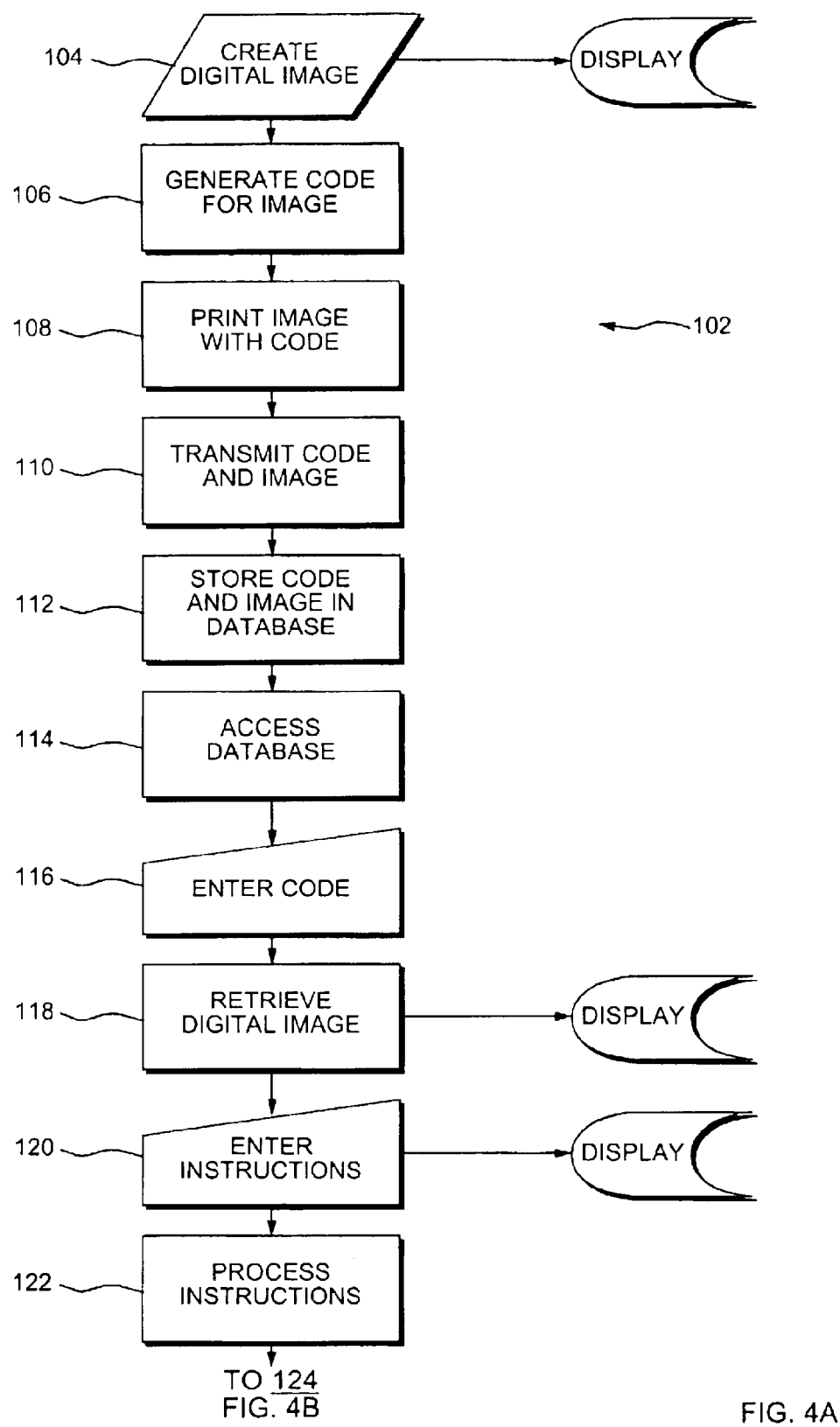

STEPS 128-130 — CUSTOMER ACCESSES FOTO FANTASY WEB SITE VIA HOME COMPUTER OR PHOTO E-MAIL STATION AT THE MALL. FIRST THE COMPUTER MONITOR WILL ASK:

AFTER CUSTOMER ENTERS HIS PHOTO ID HIS IMAGE APPEARS ON HIS MONITOR SCREEN

STEP 132

CUSTOMER WILL BE ASKED TO CLICK ON THE MENU BUTTON TO VIEW THE CHOICES AVAILABLE TO HIM

PHOTOBOOTH/E-MAIL CENTER

CROSS-REFERENCE

This is a continuation-in-part of U.S. patent application Ser. No. 08/969,976 filed on Nov. 13, 1997.

FIELD OF THE INVENTION

This invention relates to a combination photobooth/e-mail center adapted to take a digitized photograph of a user at a first station at the center and to transmit the photograph via electronic mail from a second location at the center to a remote location.

BACKGROUND OF THE INVENTION

Self-photography booths have been used for years. The traditional booths included a camera that was actuated once the user inserted the correct amount of money. A time mechanism was employed to take a specific number of flash pictures of the occupant or occupants of the booth. With the advent of computer and video technology, the booths have been modernized. Video cameras allow a live image of the user to be taken. Video processing of the image then allows a photograph to be generated from that live image.

Stand alone postcard e-mail devices are also known. These devices enable a user to send an electronic postcard to another person by electronic mail by scanning a photograph provided by the user and sending the scanned image as instructed by the user. Other similarly known scanning devices enable a user to scan a photograph into a printer which, in turn, reproduces the scanned image onto a variety of fanciful objects such as a mug or a t-shirt. However, the necessary step of scanning the image into these secondary devices reduces the quality of the reproduced image.

Stand alone photo or video e-mail devices are also known. These devices enable a user to send an electronic postcard or an electronic video clip of the user in a digitized form and then send this image to any e-mail address right from this stand alone station. However, these devices inconveniently combine two very different functions: photo taking function and the e-mail function. Photo taking function usually takes three to five minutes and typically includes: inserting money into a bill acceptor; selecting various backgrounds; freezing and unfreezing the desired pose; and actually printing the photo using a printer. During this time, the photobooth is occupied by one customer and no one else can use the booth. After the user's image is captured, the e-mail function starts. The customer must then begin using a keyboard to type in his or her name and e-mail address, the addressee's name and e-mail address, the message and the command to "save". The combination of these functions is a deterrent to the uninitiated, is time consuming for the user and limits the economic return on the photobooth.

SUMMARY OF THE INVENTION

It therefore an object of this invention to provide a combination photobooth/e-mail center having separate function stations to facilitate concurrent use by more than one user.

It is a further object of this invention to provide a combination photobooth/e-mail center which enables a user to send a copy of a digital photograph taken at the photobooth using electronic mail, or otherwise purchase additional copies of the photograph, via the Internet, having the same picture quality as the original digital photograph.

It is a further object of this invention to provide a device for taking a live photograph and for sending a digitized postcard of the photograph to someone else via electronic mail.

It is a further object of this invention to provide a device for taking a live photograph at a first station and for sending a digitized postcard of the photograph to someone else via electronic mail at a second station.

It is a further object of this invention to provide a photobooth which creates a digitized photograph imprinted with a code number which can later be electronically retrieved by the user at a remote computer terminal via the Internet, at which point the user may send a copy of the photograph to another person by electronic mail or may purchase alternative print forms of the photograph.

This invention results from efforts to provide users of self-photography booths with a device and method for sending a digital photograph taken at the booth to another person by electronic mail and/or for purchasing additional prints of the photograph in various print forms. These efforts were also intended to create opportunities for the owner of the self-photography booths to generate additional income from use of the booths after the first original print is delivered to the user at the booth. In effect, the invention relates to an indexed database of digital negatives. The database is then used to support insertion, deletion and retrieval of digitized photographic images taken at a plurality of remotely located photobooths connected to a central computer via a modem or other available communication means.

The preferred embodiment of the photobooth/e-mail center of the invention for taking a digitized photographic image of a user at a first station and retrieving and electronically displaying the digitized photographic image at a second station comprises: one or more first stations, comprising, a means for taking the digitized photograph of the user; a first means for displaying the digitized photograph; a means for generating a code corresponding to the digitized photographic image; means for printing and delivering a hardcopy of the photograph to the user at the first station; and a means for transmitting the digitized photograph and the code to a first database residing in one or more second stations; the second station, comprising, a means for electronically entering the code; a means for retrieving the stored digitized photograph from the first database in response to the means for electronically entering the code; a means for receiving and storing the digitized photograph in response to the means for retrieving the stored digitized photograph from the first database; and a second means for transmitting the digitized photograph to one or more third stations.

The photobooth/e-mail center may further comprise a means for transmitting the digitized photograph to a second database residing in a remote computer, wherein the remote computer is preferably a web server. The means for transmitting the digitized photograph to the web server may comprise one or more lines selected from a group consisting of a laplink, modem, TS and ISDN line. Depending on the location of the stations of the invention, the means for transmitting the digitized photograph and the code to the first database may also comprise one or more lines selected from a group consisting of a laplink, modem, TS and ISDN line.

The photobooth/e-mail center may also comprise one or more fourth stations from which the second database is capable of being accessed. The means for electronically entering the code preferably includes a means for entering a message; and wherein the second means for transmitting the digitized photograph to one or more third stations is further capable of transmitting the message with the digitized photograph to the one or more third stations.

The preferred method of the invention for use at a photobooth/e-mail center for taking a digitized photographic image of a user at one or more first stations, retrieving and electronically displaying the digitized photographic image at one or more second stations, and transmitting the digitized photographic image to one or more third stations, comprises the steps of: taking the digitized photograph of the user at the first station; displaying the digitized photograph; generating a code corresponding to the digitized photographic image; transmitting the digitized photograph and the code to a first database residing in the second station; accessing the first database at the second station; entering the code at the second station; retrieving the stored digitized photograph from the database in response to entering the code; receiving and storing the digitized photograph in response to retrieving the stored digitized photograph from the first database; displaying the digitized photograph; and transmitting the digitized photograph to a third station. The method preferably comprises the steps of providing a second database residing in a remote computer; accessing the second database at a fourth station; entering the code at the fourth station; retrieving the stored digitized photograph from the second database in response to entering the code; and receiving and storing the digitized photograph in response to retrieving the stored digitized photograph from the second database. The method may also include the step of printing and delivering a hardcopy of the photograph to the user at the first station.

BRIEF DESCRIPTION OF THE DRAWINGS

Other objects, features and advantages will occur to those skilled in the art from the following description of preferred embodiments and the accompanying drawings, in which:

FIGS. 4A and 4B are a block diagram of the steps of the method of the invention;

DESCRIPTION OF PREFERRED EMBODIMENTS

This invention generally relates to a photobooth/e-mail center which enables a user of the photobooth to send copies of the digital photograph taken at the photobooth to another person by electronic mail and/or purchase additional copies or alternative print formats of the photograph after the user has completed the initial transaction at the photobooth. It is envisioned that a user of the photo booth of this invention will purchase a photo, on which appears a code that is unique to and corresponding to the user's photograph, and a telephone number or e-mail address for ordering additional copies and/or a catalog of alternative print formats. The code and telephone number or e-mail address may also be delivered to the user on a separate receipt or visually on a monitor provided at the photo booth. The digitized photograph and corresponding code are automatically transmitted to a first database residing in an e-mail station located proximate to the photobooth and to a second database residing in a remote computer which acts as a web server.

At some later time determined by the user, the user has the option to send a copy of the digital photograph, such as a digital postcard, to another person by accessing the coded digital photograph in the e-mail station proximate to the photobooth and/or from the central database of the web server via the Internet and sending the digital photograph, via the Internet or electronic mail, to one or more target e-mail addresses. The user may also, using the same database of the web server, order additional copies of the coded digital photograph or alternative print forms.

Figure 1:
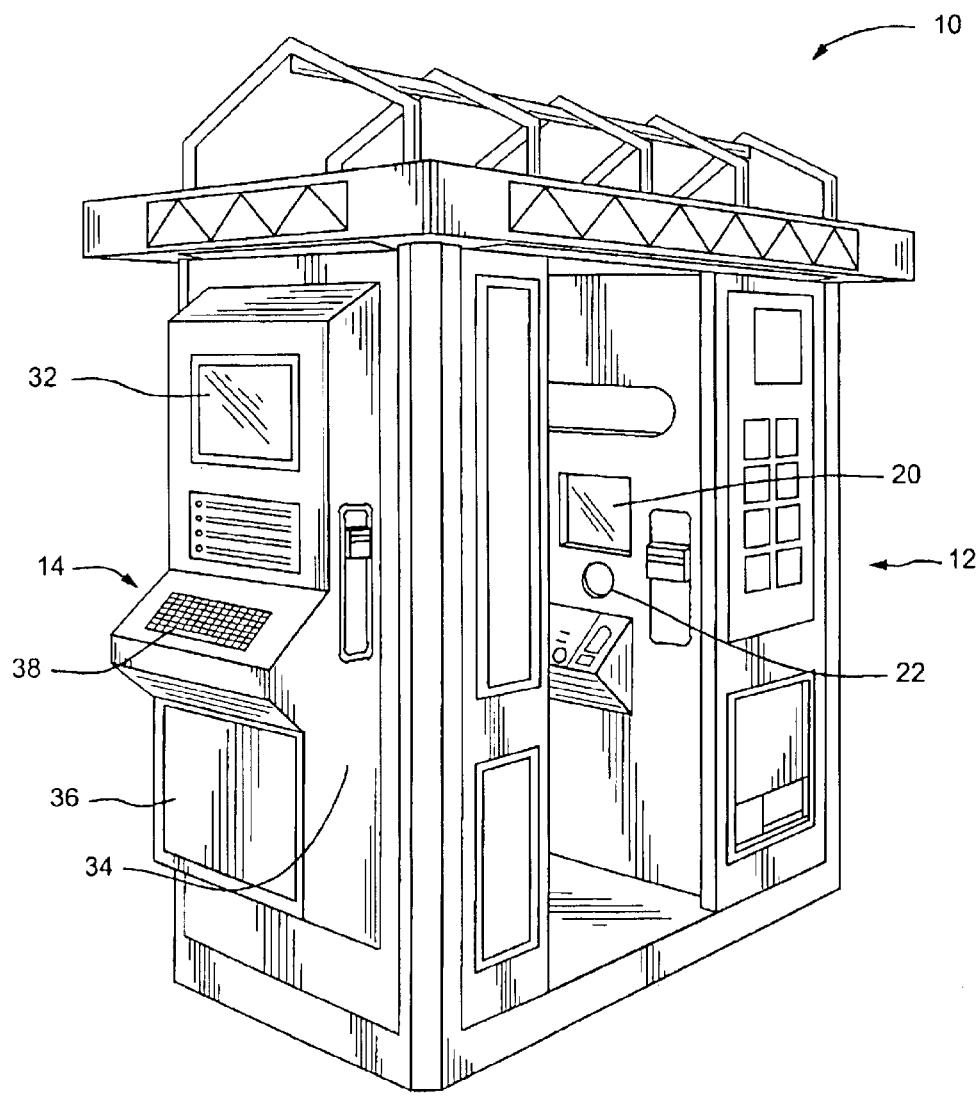
FIG. 1 is a perspective view of the preferred embodiment of the photobooth/e-mail center of the invention.
Figure 2:
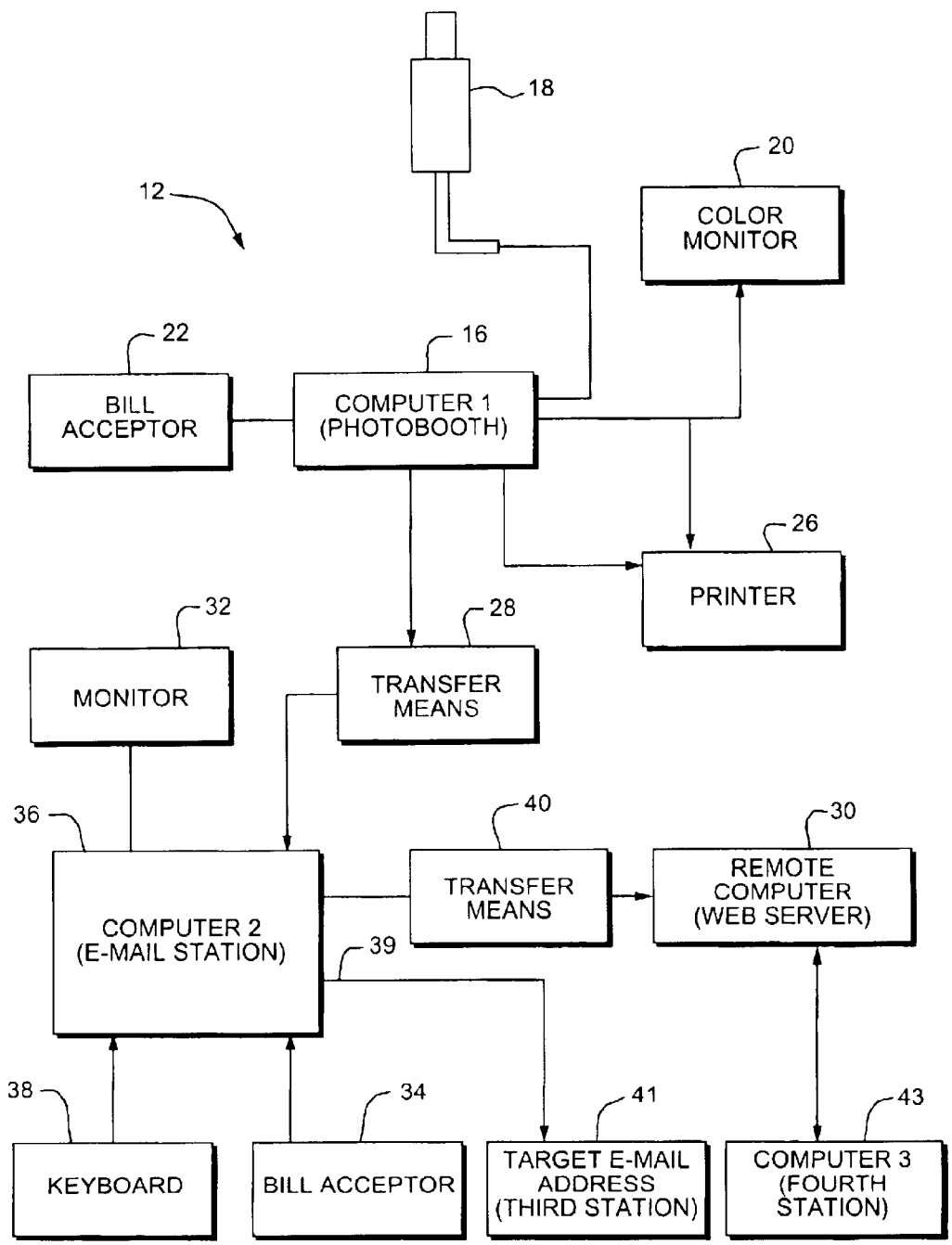
FIG. 2 is a block diagram of the photobooth/e-mail center of the invention.

A preferred embodiment of the photobooth/e-mail center of the invention is shown in FIG. 1 and is generally referred to as center 10. Center 10 is provided with a first station, photobooth station 12, and a second station, e-mail station 14. The preferred embodiments of the photobooth of the invention are shown and more specifically described in U.S. patent applications Ser. Nos. 08/969,976 and 08/961,780, incorporated herein by reference. Generally, photobooth station 12 comprises personal computer 16 used to process and at least temporarily save the digitized photograph and to generate a code corresponding to the digitized photograph. The station also includes video camera 18 for taking the digitized photograph of the user, monitor 20 for displaying the digitized photograph and printer 26 for printing a hardcopy of the digitized photograph on which the generated code is printed along with various other desired information. Such information may include fanciful composite designs, Internet addresses, telephone numbers, facsimile numbers, ordering information, slogans and/or advertisements.

Video camera 18 is positioned to capture a portrait image or bust of a user standing or sitting in front of the station. A bill acceptor 22 and monitor 20 are positioned on the front surface of photobooth station 22 for easy access and visibility. Photobooth station 12 also comprises a means 28 for transmitting the digitized photograph and code to computer 36 residing in e-mail station 14. Means 28 for transmitting is preferably a Windows NT network connection, although other means for suitably transmitting known in the art may also be used.

E-mail station 14 also is fitted with keyboard 38 for entering the code and any other information, such as an e-mail message, into the computer; and bill acceptor 34. The digitized photograph and code are likewise transmitted via transfer means 40 to a remote computer preferably residing at web server 30.

The computer of web server 30 is preferably a central processor used to manage a website and to process, manage and store a database of the digital photographs taken at a plurality of satellite photobooths at various locations remote from the central processor. Each of the satellite e-mail stations is preferably configured to communicate with web server 30 via means for transmitting 40. The means for transmitting 40 may comprises an analog and/or digital line including but not limited to laplink, modem, TS or ISDN lines. In the preferred embodiment, the data stored in the first database residing in e-mail station 14 is uploaded to web server 30 every few hours. Web server 30 may also be configured to download new services, advertisements and new coding information during periods of the day or night when the photobooth and e-mail stations are not in use.

Web server 30 may then be accessed by any computer (fourth station 43) linked to the Internet. Once the web site name (URL) is accessed via the Internet, the user may then enter the code corresponding to the digitized photograph to order additional copies or alternative print formats of the photograph or otherwise retrieve and display the photograph stored in the second database of the web server.

Figure 3:
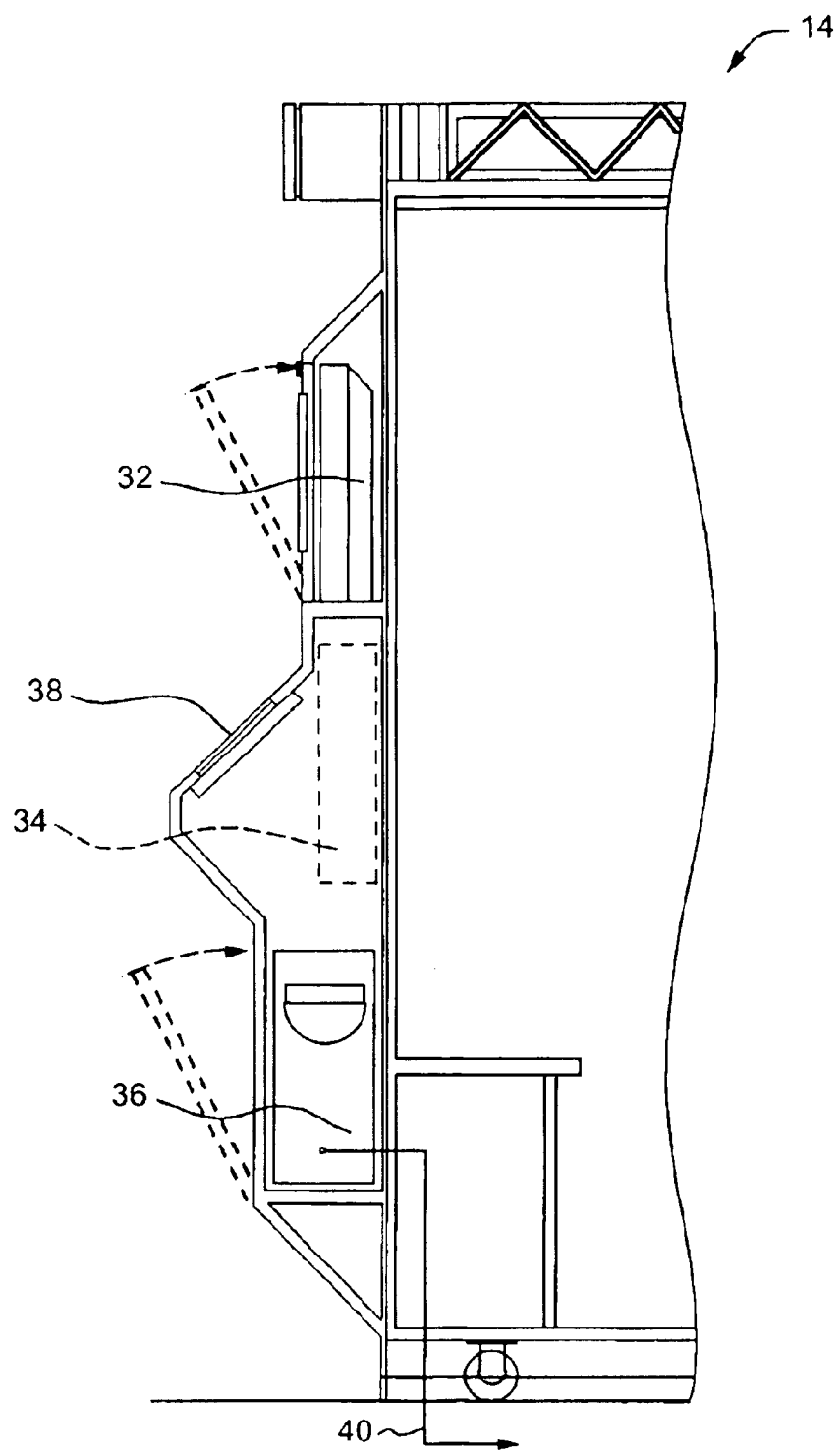
FIG. 3 is a cross-sectional view of the e-mail station of the photobooth/e-mail center of FIG. 1.

The second station of center 10, e-mail station 14, is shown in cross-section in FIG. 3. Station 14 comprises computer 36 for accessing the database in computer 30 through means 40 and for retrieving and temporarily storing the digitized photograph transmitted from computer 16 through means 28 for communicating with computer 36 in response to keyboard 38 used to enter the code for the digitized photograph. Once retrieved from the first database in computer 36, the digitized photograph is preferably displayed on monitor 32 along with or in connection with e-mail or ordering information. Means 39 is used to transmit the digitized photograph with an e-mail message to one or more target e-mail addresses (third station 41) which is configured to receive information through electronic mail and/or the Internet.

Figure 4B:
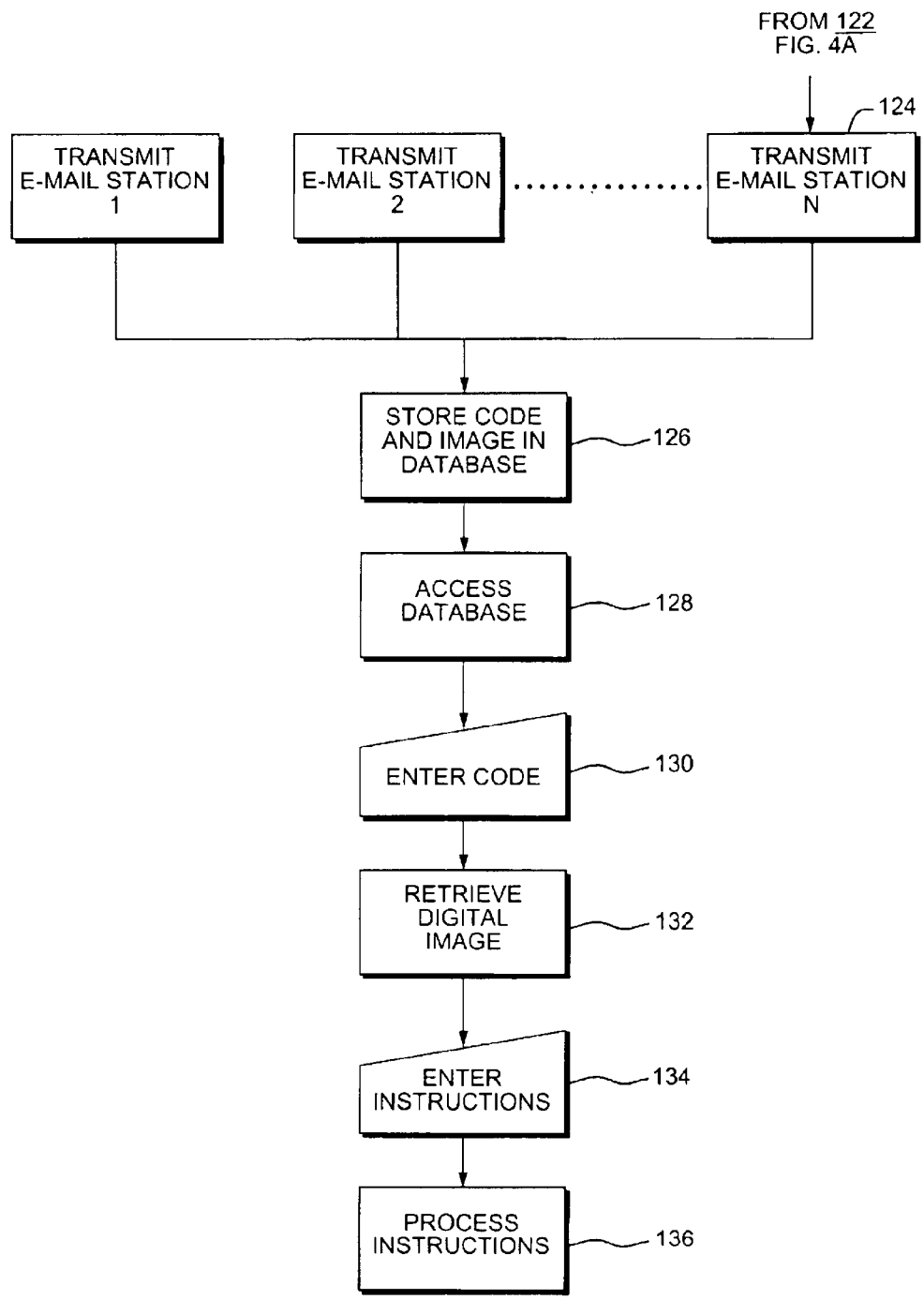
Figure 5A:
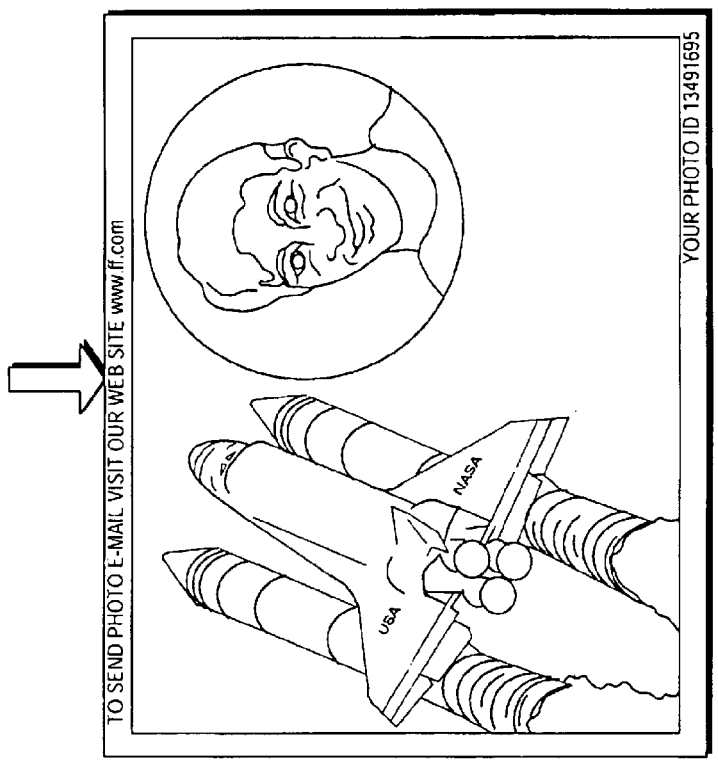
FIG. 5A is a detailed view of steps 104–106.

FIG. 4 is a block diagram of the steps of method 102 utilized by the photobooth/e-mail center of the invention. Method 102 begins with step 104 in which a digital image of the user, positioned in front of photobooth 12, is taken using video camera 18 and processed by computer 16. A unique code corresponding to the user's photographic image is generated by computer 16 in step 106. The digital image may be displayed on monitor 20 as shown in FIG. 5A, before or after step 106. In response to the user's command, a first hardcopy of the digital image is printed and delivered to the user in step 108 while at booth 12. Both the code and complete instructions for obtaining additional original copies and/or alternative forms of print media are preferably printed on the front or back of the first hardcopy of the digital image delivered to the user at booth 12. Alternatively, the code and/or instructions may be printed on a separate receipt which is delivered to the user at the booth or may be displayed on monitor 20.

The code effectively identifies each photographic image from all other photographic images. The codes preferably comprise alphanumerical codes. For example, the code may comprise a twelve digit code such as 10289675.425 wherein the first six digits represent the date the photograph was taken, Oct. 28, 1996; the next two digits represent the sequential position of the photograph among all photographs taken on that day, namely, the 75th photograph saved on Oct. 28, 1996; and the last three digits represent the specific photobooth at which the photograph was taken. In summary, this code indicates that the photograph was the 75th photograph taken by photobooth #425 on Oct. 28, 1996.

Figure 5B:
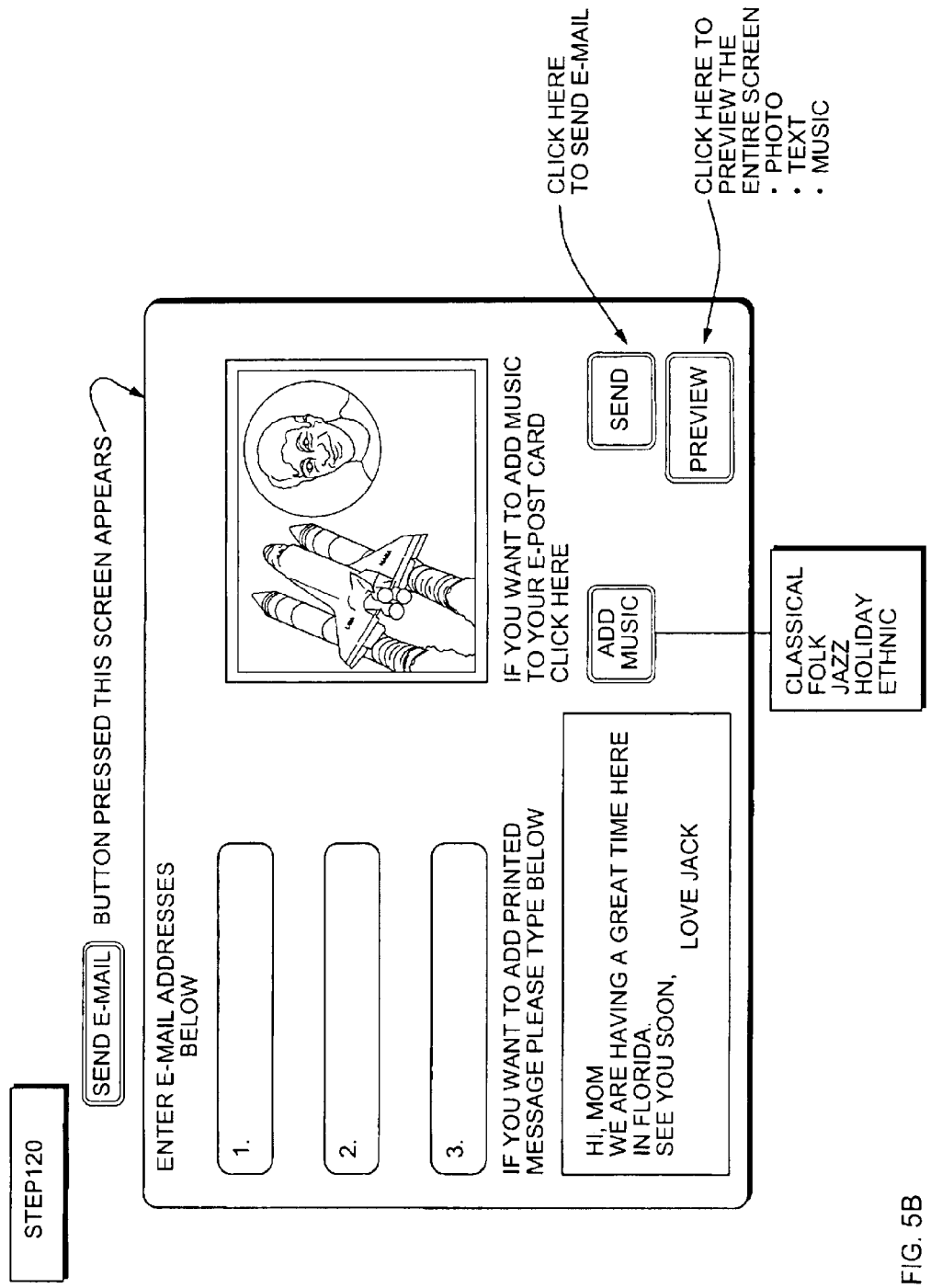
FIG. 5B is a detailed view of steps 114–116.

Both the digital image and the code is transmitted in step 110, via transmitting means 28, to and stored in a first database residing in computer 36 at e-mail station 14 in step 112. The user may then, in step 114, using e-mail station 14, retrieve the stored digitized photograph from computer 36 as shown in FIG. 5B. In response to a prompt displayed on monitor 32, the user enters the code in step 116 printed on the photograph printed at the photobooth using keyboard 38.

Once the photograph is retrieved in step 118, the user has the option to send the photograph to one or more e-mail addresses with or without a personalized message and music by entering instructions in step 120. The digital photograph may also be sent and reproduced at one or more target e-mail addresses using an animated artist's simulation as disclosed in U.S. patent application Ser. No. 08/961,780. The animated rendering of the photograph via electronic mail increases the entertainment value to the e-mail recipient. Computer 36 processes the user's instructions in step 122.

Figure 5C:
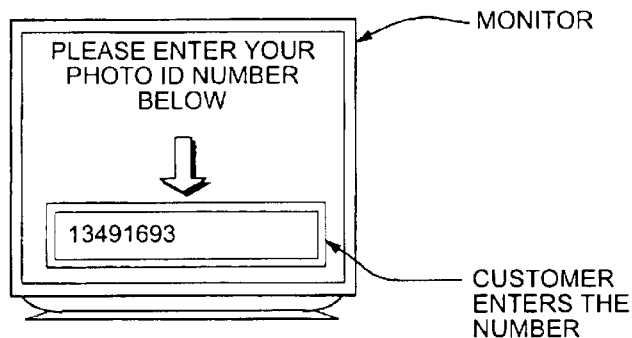
FIG. 5C is a detailed view of step 118.
Figure 5D:
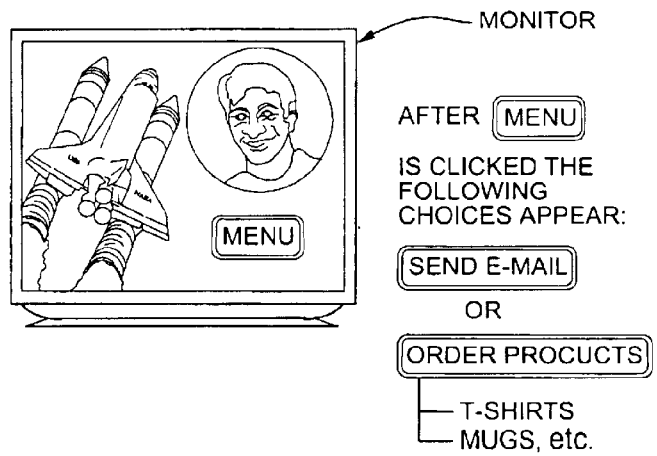
FIG. 5D is a detailed view of step 120.
Figure 5E:
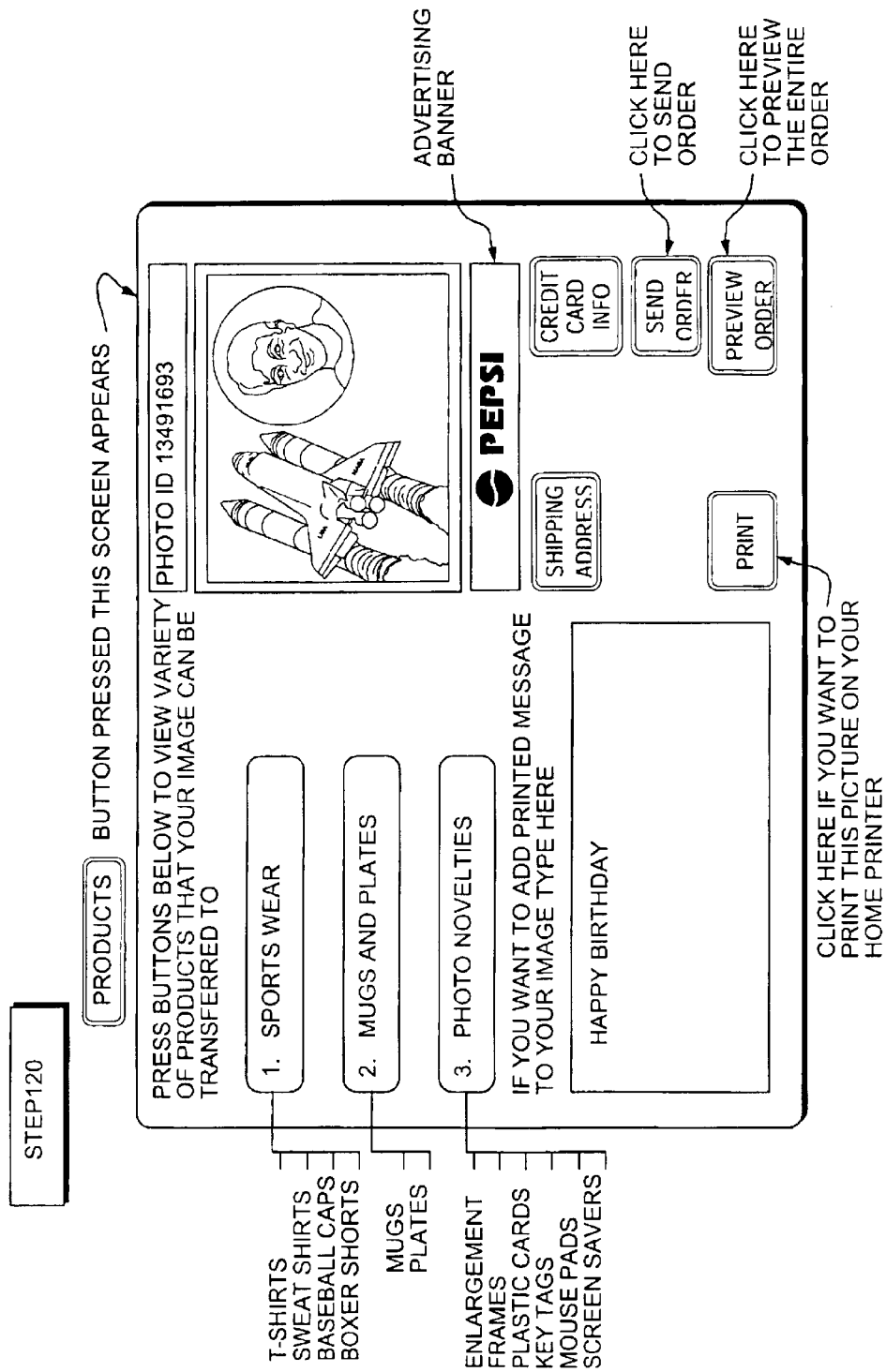
FIG. 5E is a detailed view of alternate step 120.

The device and method of the invention are both intended for use with a plurality of photobooths and e-mail stations linked to a central process server. The data from all of the photobooths and e-mail stations is transferred in step 124 via an uplink to the web server as shown in FIG. 4B. The transferred data, including all the digitized photographs and corresponding codes are stored in step 126 in a database residing in the web server which in linked to the Internet. The web server's database may be accessed by any computer connected to the Internet in step 128. As shown in FIGS. 5C–5E, once a user accesses the web site of the web server, they are prompted to enter the code, corresponding to the digitized photograph, in step 130. In response to the entered code, the photograph is retrieved from the web server's database in step 132 and displayed on the user's computer screen. The user is further prompted to select from several options including, but not limited to, sending an e-mail, ordering additional copies of the digital image and/or ordering alternative print formats imprinted on a variety of novelty items including, but not limited to, sports apparel, mugs, plates, enlargements, frames, plastic cards, key-tags, mousepads and screen savers. Once the user enter's their instructions in step 134, the user's instructions are then processed in step 136 by sending the e-mail or by processing and shipping the user's order.

Figure 6:
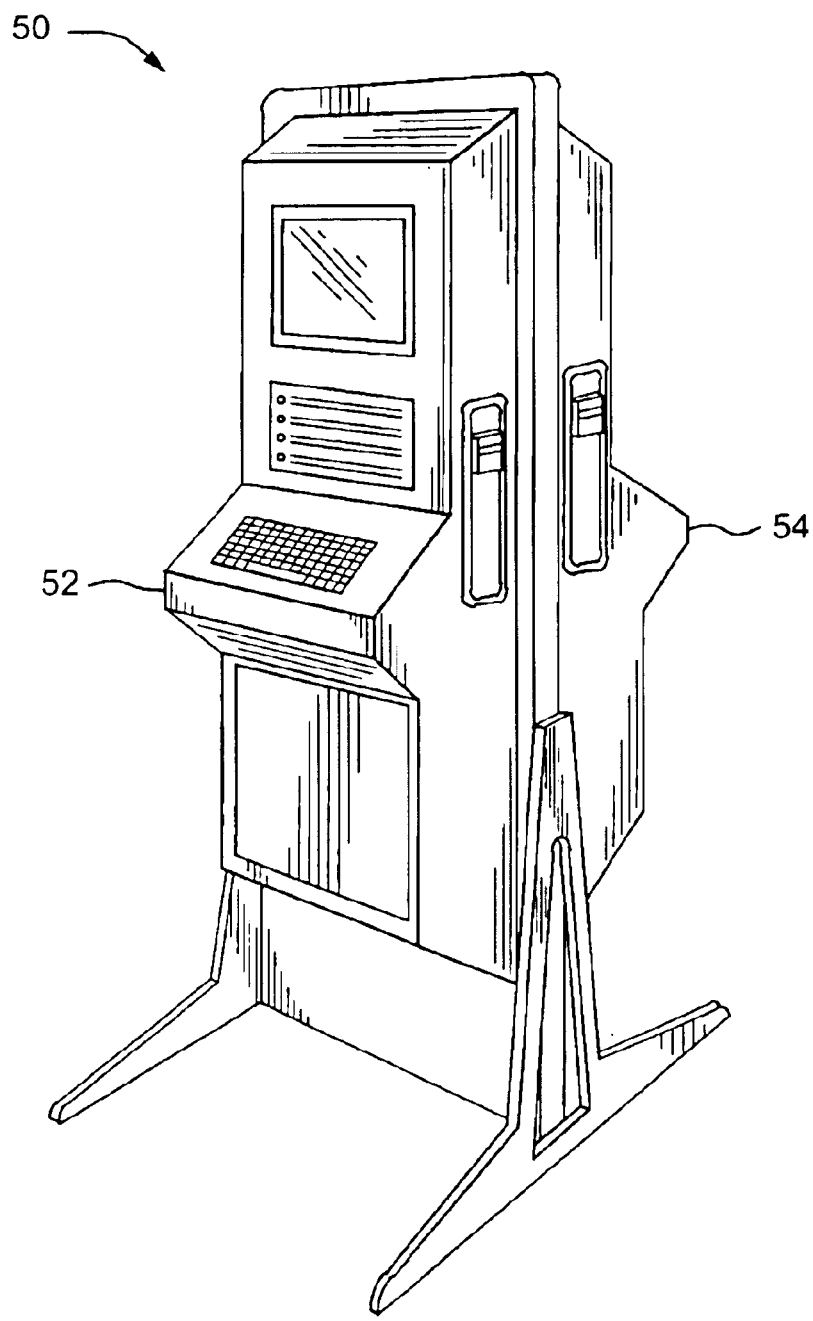
FIG. 6 is a perspective view of another preferred embodiment of the e-mail station of the photobooth/e-mail center of the invention.
Figure 7A:
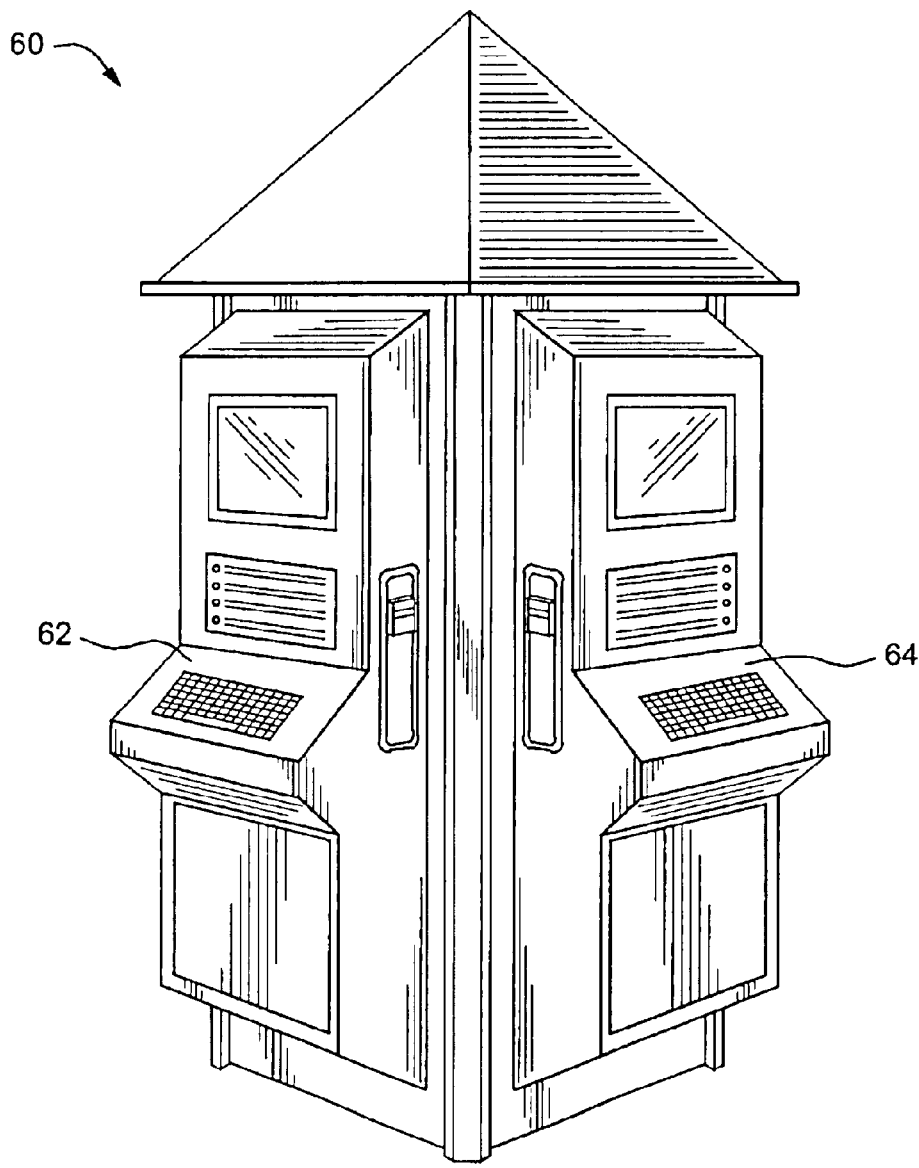
FIG. 7A is a perspective view of yet another preferred embodiment of the e-mail station of the photobooth/e-mail center of the invention.
Figure 7B:
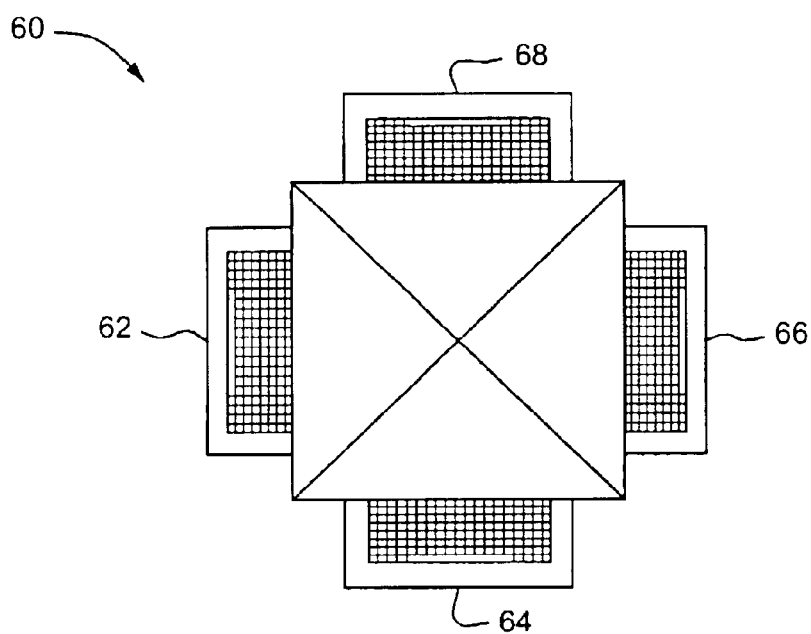
FIG. 7B is a top view of the e-mail station of FIG. 7A.

The e-mail station of the invention may be a single station as shown in FIG. 1 or a two-sided station 50 shown in FIG. 6 having two terminals, 52 and 54, or a foursided station 60 shown in FIGS. 7A and 7B having four terminals, 62, 64, 66 and 68.

Figure 8:
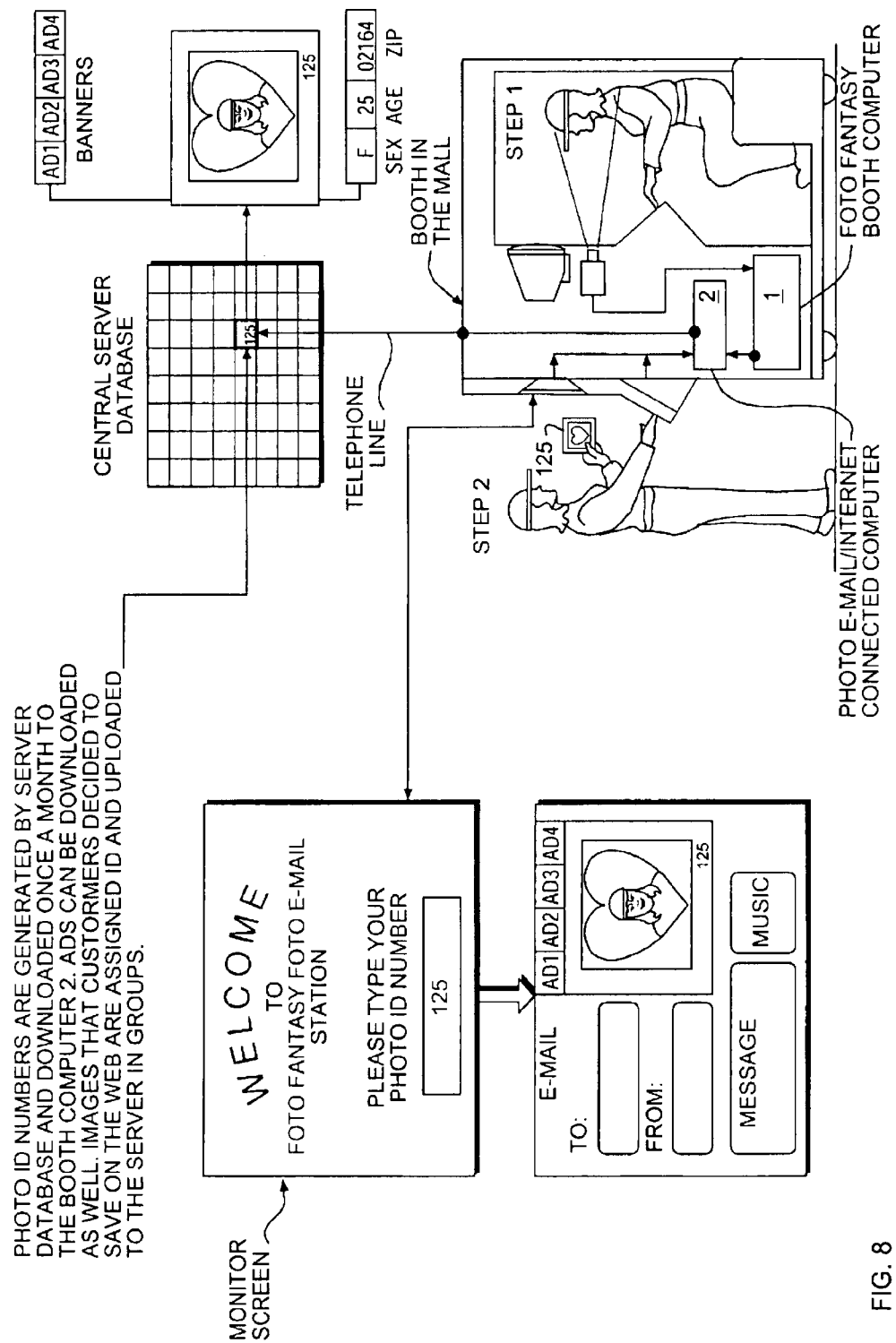
FIG. 8 is a schematic view of the preferred embodiment of the photobooth/e-mail center of FIG. 1.

Computer 16 and computer 36 are preferably configured to interface directly without intermediate communication with remote computer 30. It is also possible to configure both stations of the photobooth/e-mail center, as shown in FIG. 8, to share a single computer and a single means for communicating with a centralized database in a remote computer.

As noted, in any of the preferred embodiments, the photo identification numbers or codes may be generated by a server database in the remote central computer and downloaded periodically to the computers in the satellite photobooths. Additionally, advertisements may be downloaded periodically to use as printed banners and/or slogans on the printed photographs delivered to the users at the photobooths.

Composing, typing and sending an e-mail message can be time consuming. If the photobooth and the e-mail stations were combined into a single station, the photobooth would be undesirably occupied for long periods of time. Such a configuration reduces the profitability of the device. The invention solves this problem by separating the e-mail station from the photobooth station and their respective functions, thereby increasing the income potential of the center. In addition, positioning the e-mail station on the outside of the center creates traffic, which draws attention to the e-mail function, which in turn persuades passers-by to have their photographs taken because the resulting photograph may also be sent as an e-mail postcard. It is also advantageous to provide the user with a hardcopy photograph at the separate photobooth because the user will be more likely to send an e-mail postcard having first seen the photograph.

Although specific features of this invention are shown in some drawings and not others, this is for convenience only as some feature may be combined with any or all of the other features in accordance with the invention.

Other embodiments will occur to those skilled in the art and are within the following claims.

What is claimed is:

1. A photobooth/e-mail center for taking a digitized photographic image of a user at a first station and retrieving and electronically displaying said digitized photographic image at a second station comprising:
   one or more first stations, comprising,
      a means for taking said digitized photograph of said user;
      a first means for displaying said digitized photograph;
      a means for generating a code corresponding to said digitized photographic image;
      means for printing and delivering a hardcopy of said photograph to said user at said first station; and
      a means for transmitting said digitized photograph and said code to a first database residing in one or more second stations;
   said second station, comprising,
      a means for electronically entering said code;
      a means for retrieving said stored digitized photograph from said first database in response to said means for electronically entering said code;
      a means for receiving and storing said digitized photograph in response to said means for retrieving said stored digitized photograph from said first database; and
      a second means for transmitting said digitized photograph to one or more third stations.

2. The photobooth/e-mail center of claim 1, further comprising a means for transmitting said digitized photograph to a second database residing in a remote computer.

3. The photobooth/e-mail center of claim 2, wherein said remote computer is a web server.

4. The photobooth/e-mail center of claim 3, wherein said means for transmitting said digitized photograph to said web server comprises one or more lines selected from a group consisting of a laplink, modem, TS and ISDN line.

5. The photobooth/e-mail center of claim 2, further comprising one or more fourth stations from which said second database is capable of being accessed.

6. The photobooth/e-mail center of claim 5, wherein said means for electronically entering said code further comprises a means for entering a message; and wherein said second means for transmitting said digitized photograph to one or more third stations is further capable of transmitting said message with said digitized photograph to said one or more third stations.

7. The photobooth/e-mail center of claim 1, wherein said means for transmitting said digitized photograph and said code to said first database comprises one or more lines selected from a group consisting of a laplink, modem, TS and ISDN line.

8. A method for use at a photobooth/e-mail center for taking a digitized photographic image of a user at one or more first stations, retrieving and electronically displaying said digitized photographic image at one or more second stations, and transmitting said digitized photographic image to one or more third stations, comprising the steps of:
   taking said digitized photograph of said user at said first station;
   displaying said digitized photograph;
   generating a code corresponding to said digitized photographic image; and
   transmitting said digitized photograph and said code to a first database residing in said second station;
   accessing said first database at said second station;
   entering said code at said second station;
   retrieving said stored digitized photograph from said database in response to entering said code;
   receiving and storing said digitized photograph in response to retrieving said stored digitized photograph from said first database;
   displaying said digitized photograph; and
   transmitting said digitized photograph to a third station.

9. The method of claim 8, further comprising a second database residing in a remote computer.

10. The method of claim 9, further comprising the steps of,
    accessing said second database at a fourth station;
    entering said code at said fourth station;
    retrieving said stored digitized photograph from said second database in response to entering said code; and
    receiving and storing said digitized photograph in response to retrieving said stored digitized photograph from said second database.

11. The method of claim 8, further comprising a step of printing and delivering a hardcopy of said photograph to said user at said first station.

* * * * *